United States Patent
Nishimoto et al.

(10) Patent No.: US 6,993,933 B2
(45) Date of Patent: Feb. 7, 2006

(54) ABSORPTION REFRIGERATING MACHINE

(75) Inventors: Haruki Nishimoto, Tochigi (JP); Akira Hatakeyama, Tochigi (JP); Kazuyasu Iramina, Tochigi (JP); Hideki Funai, Tochigi (JP)

(73) Assignees: Sanyo Electric Co., Ltd., Osaka (JP); Sanyo Electric Air Conditioning Co., Ltd., Tochigi (JP)

( * ) Notice: Subject to any disclaimer, the term of this patent is extended or adjusted under 35 U.S.C. 154(b) by 100 days.

(21) Appl. No.: 10/831,542

(22) Filed: Apr. 23, 2004

(65) Prior Publication Data

US 2005/0016205 A1 Jan. 27, 2005

(30) Foreign Application Priority Data

Apr. 24, 2003 (JP) ......................... 2003-119774

(51) Int. Cl.
*F25B 15/00* (2006.01)

(52) U.S. Cl. .......................... 62/489; 62/476
(58) Field of Classification Search ................... 62/489, 62/497, 476, 494, 485
See application file for complete search history.

(56) References Cited

U.S. PATENT DOCUMENTS

| | | | | |
|---|---|---|---|---|
| 5,782,099 A | * | 7/1998 | Hoshino et al. | 62/148 |
| 6,305,173 B1 | * | 10/2001 | Fineblum | 62/5 |
| 6,389,841 B1 | * | 5/2002 | Feldman et al. | 62/476 |

* cited by examiner

*Primary Examiner*—Melvin Jones
(74) *Attorney, Agent, or Firm*—Weingarten, Schurgin Gagnebin & Lebovici LLP

(57) ABSTRACT

Even when the efficiency of a low temperature heat exchanger is raised to reduce the required heat capacity inputting to the absorption refrigerating machine and the temperature of cooling water supplied to an absorber falls suddenly as it is, and thereby the temperature of a diluted absorbent solution falls suddenly, an absorption refrigerating machine without abnormally increasing the temperature of the concentrated absorbent solution and crystallizing the solution is disclosed. A heat recovery device 8 is provided between a low temperature heat exchanger 6 and a high temperature heat exchanger 7 of an absorbent solution pipe 13 for connecting a high temperature regenerator 1 and an absorber 5 with the low temperature heat exchanger 6, the high temperature heat exchanger 7 and an absorbent solution pump 14 therebetween. Further, the heat recovery device 9 is provided between the low temperature heat exchanger 6 and the absorbent solution pump 14. High temperature and high-pressure vapor is supplied through a heat source fluid supply pipe 10 to a heat exchanger pipe 1A provided within the high temperature generator 1 to thereby heat and boil a diluted absorbent solution within the high temperature regenerator 1 and radiate heat. Then, high temperature drain, which has been condensed by heat radiation and discharged to an exhaust heat fluid pipe 10A, is supplied to the heat recovery devices 8, 9 to thereby heat a diluted absorbent solution delivered from the absorber 5 through the absorbent solution pipe 13 to the high temperature regenerator 1 by an absorbent solution pump 14.

1 Claim, 4 Drawing Sheets

ABSORPTION REFRIGERATING MACHINE

This application claims priority to a Japanese application No. 2003-119774 filed Apr. 24, 2003.

BACKGROUND OF THE INVENTION

1. Field of the Invention

The present invention relates to an absorption refrigerating machine (including an absorption type hot/cold water service machine).

2. Description of the Related Art

The absorption refrigerating machine of this type includes, for example, a known absorption refrigerating machine 100X (see Patent Document 1) as shown in FIG. 3. In this absorption refrigerating machine 100X, high temperature and high-pressure vapor is supplied to a heat exchanger pipe 1A provided within a high temperature regenerator 1 via a heat source fluid supply pipe 10. A diluted absorbent solution within the high temperature regenerator 1 is heated and boiled through a pipe wall of the heat exchanger pipe 1A to thereby radiate heat. High temperature drain, which has been condensed by the heat radiation and has been discharged from the heat exchanger pipe 1A to an exhaust heat fluid pipe 10A, is supplied to a heat recovery device 8 which is provided in an absorbent solution pipe 13 for connecting the high temperature regenerator 1 and an absorber 5, along with an absorbent solution pump 14, a low temperature heat exchanger 6, and a high temperature heat exchanger 7. The high temperature drain heats a diluted absorbent solution delivered through the absorbent solution pipe 13 from the absorber 5 to the high temperature regenerator 1 by the absorbent solution pump 14. As a result, the required heat capacity of the heat source fluid inputted through the heat source fluid supply pipe 10 is reduced.

Further, as shown in FIG. 4, another absorption refrigerating machine 100Y having the same purpose as the machine 100X, is also known (see Patent Document 1). In this pump 14. As a result, the required heat capacity of the heat source fluid inputted through the heat source fluid supply pipe 10 is reduced.

Further, as shown in FIG. 4, another absorption refrigerating machine 100Y having the same purpose as the machine 100X, is also known (see Patent Document 1). In this absorption refrigerating machine 10Y, a part of an absorbent solution pipe 13 downstream from a low temperature heat exchanger 6 is branched into an absorbent solution pipe 13A and an absorbent solution pipe 13B. One absorbent solution pipe 13A is provided with a high temperature heat exchanger 7. The other absorbent solution pipe 13B is provided with a heat recovery device 8. As shown in FIG. 5, another absorption refrigerating machine 100Z is also known (see Patent Document 1). In this absorption refrigerating machine 100Z, a heat recovery device 8 and a heat recovery device 9 are positioned in series on an exhaust heat fluid pipe 10A. In the heat recovery device 8, a diluted absorbent solution is discharged from a high temperature heat exchanger 7 and flows into a high temperature regenerator 1. In the heat recovery device 9, a diluted absorbent solution is discharged from a low temperature heat exchanger 6 and flows into a high temperature heat exchanger 7. The diluted absorbent solutions are heated by high temperature drain, which is flowing through an exhaust heat fluid pipe 10A.

Further, in any of the above absorption refrigerating machines, a concentrated absorbent solution supplied through an absorbent solution pipe 12 from a low temperature regenerator 2 to the absorber 5 heats, in a low temperature heat exchanger 6, a diluted absorbent solution supplied from the absorber 5 to the high temperature regenerator 1 through the absorbent solution pipe 13. As a result, the required heat capacity of the heat source fluid supplied through the heat source fluid supply pipe 10 is reduced.

[Patent Document 1]

Japanese Unexamined Patent Application Publication No. 2001-56160 (FIGS. 1, 12 and 15)

However, in the aforementioned conventional absorption refrigerating machine, when the heat exchange efficiency of the low temperature heat exchanger is raised, the temperature of the cooling water supplied to the absorber falls suddenly. Thereby, when the temperature of the diluted absorbent solution discharged from the absorber falls suddenly, the temperature of the concentrated absorbent solution exchanging heat with the diluted absorbent solution in the low temperature heat exchanger and supplied from the low temperature regenerator to the absorber decreases considerably, and the concentrated absorbent solution crystallizes, which result in a situation where the operation becomes impossible.

SUMMARY OF THE INVENTION

Accordingly, it is an object of the present invention to provide an absorption refrigerating machine without abnormally increasing the temperature of the concentrated absorbent solution and crystallizing the solution, even when the efficiency of a low temperature heat exchanger is raised to reduce the required heat capacity inputted to the absorption refrigerating machine and the temperature of cooling water supplied to an absorber falls suddenly as it is, and thereby the temperature of a diluted absorbent solution falls suddenly.

In order to accomplish the above object, the present invention provides an absorption refrigerating machine of a first constitution comprising a high temperature regenerator, a low temperature regenerator, a condenser, an evaporator, an absorber, a low temperature heat exchanger for performing heat exchange between absorbent solutions entering and leaving the absorber, and a high temperature heat exchanger for performing heat exchange between absorbent solutions entering and leaving the high temperature regenerator, wherein a heat recovery device is provided for collecting remaining heat holded in heat exhaust fluid through heat exchange between the heat exhaust fluid discharged from the high temperature regenerator after heating the absorbent solution, and the absorbent solution discharged from the absorber, in the absorbent solution discharged from the absorber and flowing into the low temperature heat exchanger.

Further, the present invention provides an absorption refrigerating machine comprising another heat recovery device provided on the upstream of a heat exhaust fluid passage of the heat recovery device in the absorption refrigerating machine according to the first constitution for collecting remaining heat holded in heat exhaust fluid through heat exchange between the heat exhaust fluid and the absorbent solution discharged from the low temperature heat exchanger, in the absorbent solution discharged from the low temperature heat exchanger and flowing into the high temperature heat exchanger.

DESCRIPTION OF THE PREFERRED EMBODIMENT

Figure 3:
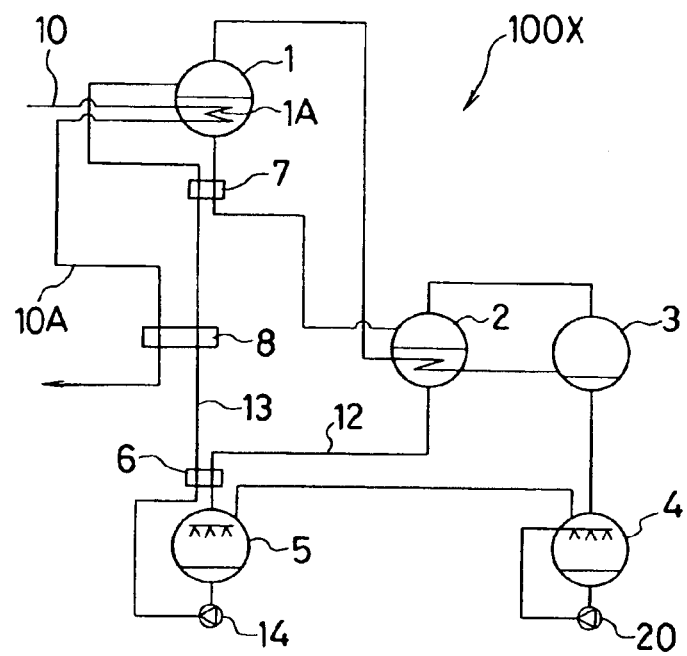
FIG. 3 is an explanatory view showing a prior art.
Figure 4:
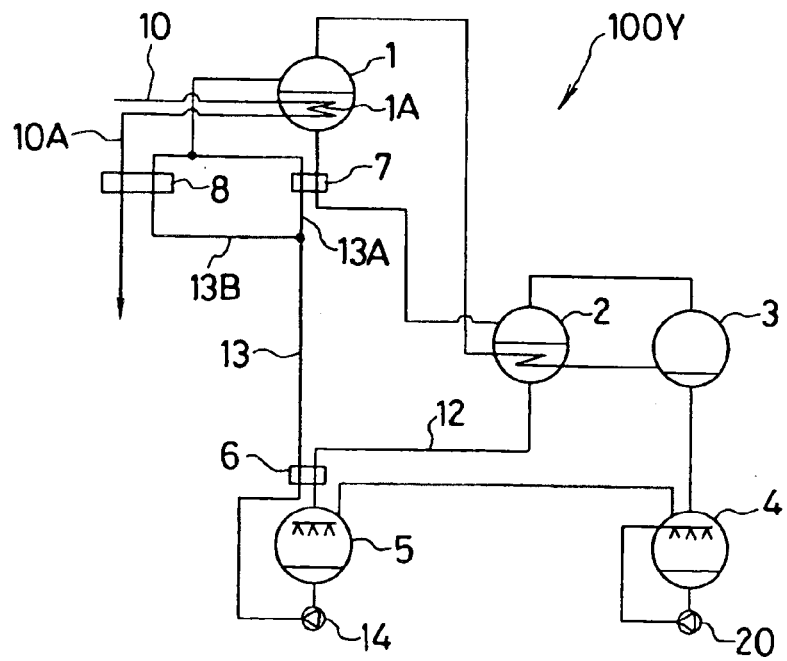
FIG. 4 is an explanatory view showing another prior art.
Figure 5:
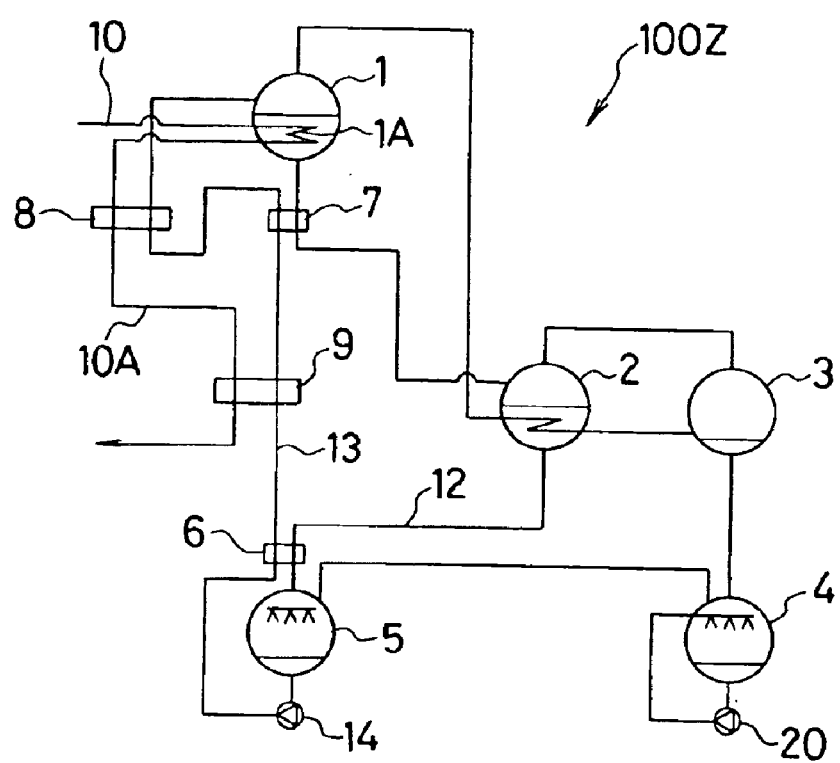
FIG. 5 is an explanatory view showing still another prior art.

Preferred embodiments of the present invention will now be described with reference to FIGS. 1 and 2. In order to help understand the present invention, the parts in these drawings having the same functions as those previously described with reference to FIGS. 3 to 5 are denoted by the same reference numerals.

Figure 1:
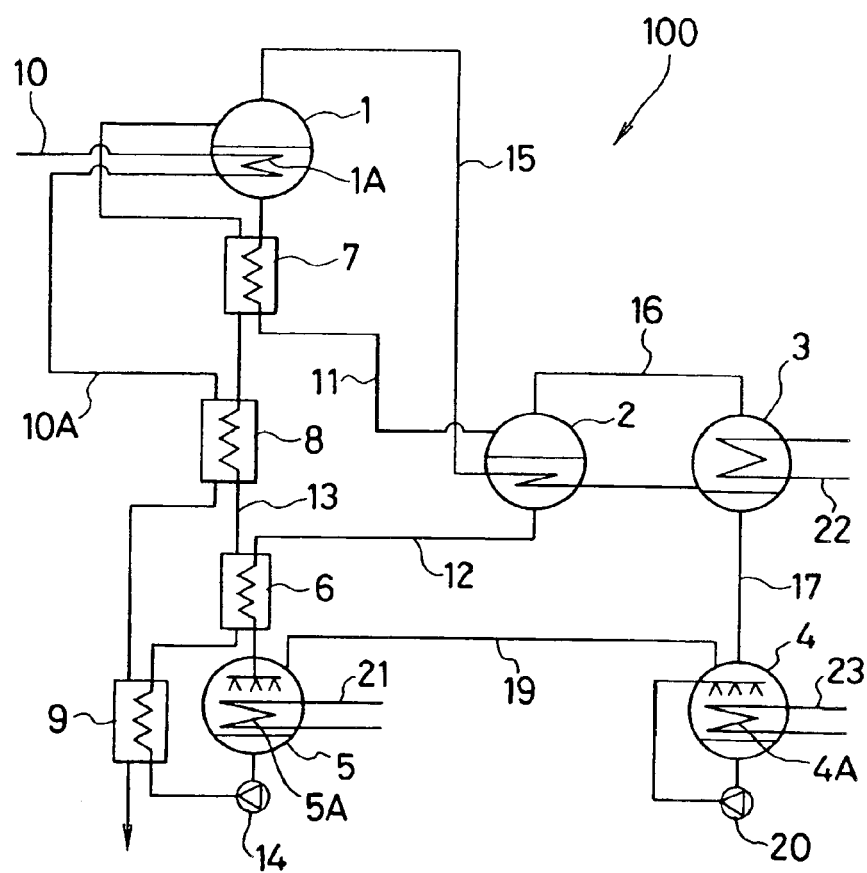
FIG. 1 is an explanatory view showing an embodiment of the present invention.

In an absorption refrigerating machine 100 of the present invention as illustrated in FIG. 1, a heat recovery device 8 is provided between a low temperature heat exchanger 6 and a high temperature heat exchanger 7 of an absorbent solution pipe 13 for connecting a high temperature regenerator 1 and an absorber 5 with the low temperature heat exchanger 6, the high temperature heat exchanger 7 and an absorbent solution pump 14 therebetween. Further, the heat recovery device 9 is provided between the low temperature heat exchanger 6 and the absorbent solution pump 14.

Therefore, high temperature and high-pressure vapor, which is supplied as a heat source through a heat source fluid supply pipe 10, heats and boils a diluted absorbent solution within the high temperature regenerator 1 to radiate heat through a pipe wall of a heat exchanger pipe 1A provided within the high temperature regenerator 1. Then, high temperature drain, which has been condensed by heat radiation and discharged to an exhaust heat fluid pipe 10A, exchanges heat with a diluted absorbent solution delivered from an absorber 5 to the high temperature regenerator 1 through the absorbent solution pipe 13 by an absorbent solution pump 14 in each of the heat recovery devices 8, 9, and heats the diluted absorbent solution.

In other words, in the absorption refrigerating machine 100 of the present invention, even though the temperature of cooling water supplied through cooling water pipe 21 to the absorber 5 falls suddenly in a state in which the heat exchange efficiency of the low temperature heat exchanger 6 is raised, and thereby the temperature of a diluted absorbent solution discharged from the absorber 5 to the absorbent solution pipe 13 falls suddenly, the diluted absorbent solution discharged to the absorbent solution pipe 13 is heated by drain flowing within the exhaust heat fluid pipe 10A in the heat recovery device 9 and is supplied to the low temperature heat exchanger 6. Thus, there are no problems in that the temperature of the concentrated absorbent solution supplied through an absorbent solution pipe 12 from the low temperature regenerator 2 to the absorber 5 abnormally decreases and crystallizes by heat exchange in the low temperature heat exchanger 6, which results in a situation where the operation becomes impossible.

Further, a circulation cycle of the refrigerant and the absorbent solution during operation of the above absorption refrigerating machine 100 of the present invention having the above described constitution will be briefly described below. High temperature and high-pressure vapor as a heat source is supplied through the hear source fluid supply pipe 10 to the heat exchanger pipe 1A provided within the high temperature regenerator 1. Then, a diluted absorbent solution within the high temperature regenerator 1 is heated and boiled through the pipe wall of the heat exchanger pipe 1A by the high temperature and high-pressure vapor. As a result, the refrigerant vapor evaporated and separated from the diluted absorbent solution and an intermediate absorbent solution having a higher concentration due to the separation of the refrigerant vapor can be obtained.

The high temperature refrigerant vapor generated in the high temperature regenerator 1 enters the low temperature regenerator 2 through a refrigerant pipe 15, heats the intermediate absorbent solution generated in the high temperature regenerator 1 and entering the low temperature regenerator 2 via the high temperature heat exchanger 7 by the absorbent solution pipe 11, radiates heat to be condensed, and then enters a condenser 3.

Further, the refrigerant evaporated and separated from the intermediate absorbent solution due to heating in the low temperature regenerator 2 enters the condenser 3 through a refrigerant pipe 16. Then, the refrigerant exchanges heat with cooling water flowing through the cooling water pipe 22 into a condensed liquid. Then, the condensed liquid enters an evaporator 4 via a refrigerant pipe 17, together with the condensed refrigerant supplied from the refrigerant pipe 15.

Refrigerant liquid, which has entered the evaporator 4 and been reserved in a refrigerant liquid reservoir, is diffused onto a heat exchanger pipe 4A connected to a brine pipe 23 through a refrigerant pipe 18 by a refrigerant pump 20, thereby exchanging heat with a brine, such as water, which has been supplied through the brine pipe 23, through the pipe wall of the heat exchanger pipe 4A, and is evaporated. As a result, the brine flowing through the inside of the heat exchanger pipe 4A is cooled.

Refrigerant evaporated in the evaporator 4 enters the absorber 5 through a refrigerant pipe 19, is heated in the low temperature regenerator 2, and itself being absorbed into the absorbent solution having further higher concentration, that is, the concentrated absorbent solution supplied via the low temperature heat exchanger 6 by the absorbent solution pipe 12 and diffused onto the heat exchanger pipe 5A connected to the cooling water pipe 21.

Further, an absorbent solution having a low concentration by absorbing the refrigerant in the absorber 5, that is, a diluted absorbent solution, is heated in the heat recovery device 9, the low temperature heat exchanger 6, the heat recovery device 8, and the high temperature heat exchanger 7, respectively, through the absorbent solution pipe 13 by the operation of the absorbent solution pump 14, and is then fed to the high temperature regenerator 1.

By circulating the refrigerant and the absorbent solution as described above, the brine, such as water, cooled by the evaporation heat of the refrigerant in the heat exchanger pipe 4A provided within the evaporator 4, can be circulated to an air conditioning load and the like (not shown) through the brine pipe 23. As a result, a cooling operation, such as air-cooling, can be performed.

Further, in the absorption refrigerating machine 100 of the present invention, the diluted absorbent solution discharged from the absorber 5, as described above, and delivered to the high temperature regenerator 1 through the absorbent solution pipe 13 by the absorbent solution pump 14 is heated in the heat recovery device 9, the low temperature heat exchanger 6, the heat recovery device 8, and the high temperature heat exchanger 7, respectively. Thus, the temperature of the diluted absorbent solution when flowing into the high temperature regenerator 1 rises higher than that with no heat recovery device 9, the heat capacity of the heat source inputted to the absorption refrigerating machine 100 through the heat source fluid supply pipe 10 can be reduced.

Moreover, even though the temperature of cooling water supplied through the cooling water pipe 21 to the absorber 5 falls suddenly, and thereby the temperature of the diluted absorbent solution discharged from the absorber 5 to the absorbent solution pipe 13 falls suddenly, the diluted absorbent solution discharged to the absorbent solution pipe 13 is heated by drain flowing through the inside of the exhaust heat fluid pipe 10A in the heat recovery device 9 and is supplied to the low temperature heat exchanger 6. Thus, there are no problems in that the temperature of the concentrated absorbent solution supplied through an absorbent solution pipe 12 from the low temperature regenerator 2 to the absorber 5 abnormally decreases by heat exchange in the low temperature heat exchanger 6, and the concentrated absorbent solution crystallizes, resulting in a situation where the operation becomes impossible.

Furthermore, the present invention is not limited to the above embodiment, but various modifications may be made without departing from the spirit and the scope of the present invention as set forth in the accompanying claims.

Figure 2:
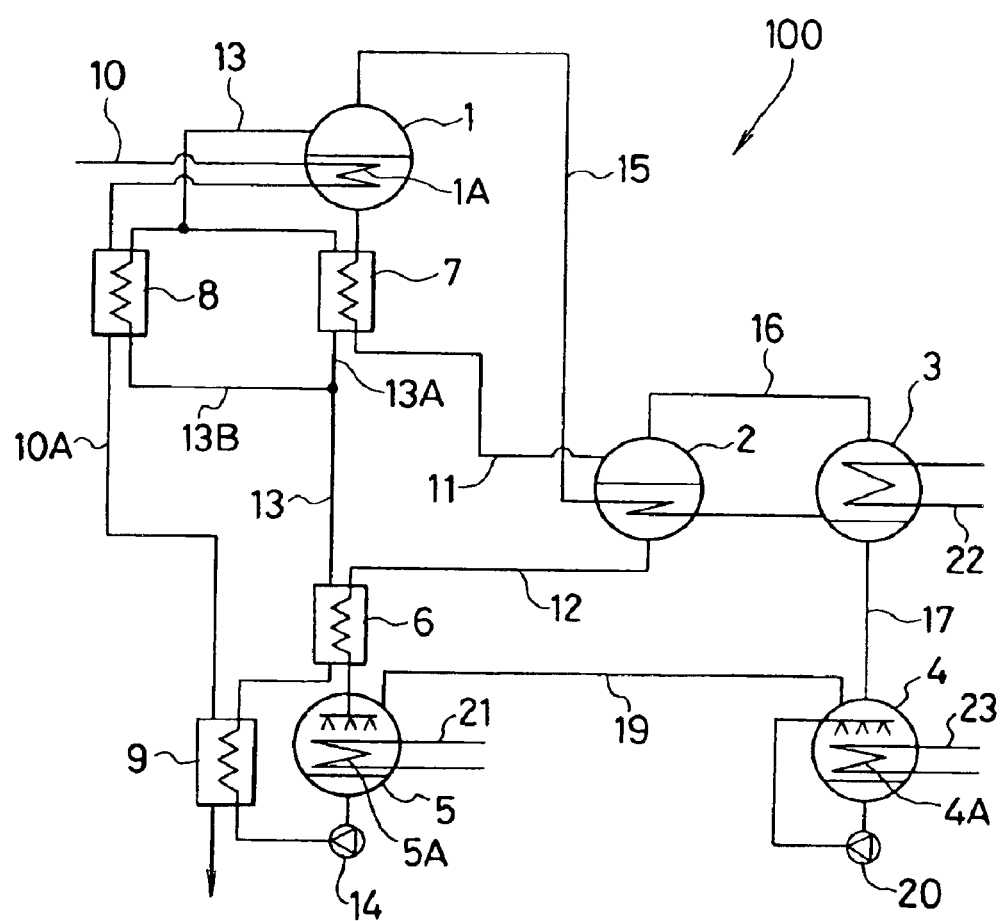
FIG. 2 is an explanatory view showing another embodiment of the present invention.

For example, as shown in FIG. 2, a part of the absorbent solution pipe 13 downstream from a low temperature heat exchanger 6 may be branched into an absorbent solution pipe 13A and an absorbent solution pipe 13B. One absorbent solution pipe 13A may be provided with a high temperature heat exchanger 7, and the other absorbent solution pipe 13B may be provided with a heat recovery device 8. The absorption refrigerating machine 100 having the constitution as shown in FIG. 2 may also have the same advantages as the absorption refrigerating machine 100 having the constitution as shown in FIG. 1.

Further, as a heat source of the high temperature regenerator 1 for obtaining the refrigerant vapor and the intermediate absorbent solution by heating the diluted absorbent solution, combustion heat obtained by burning natural gas or the like with a burner, may be preferred. When such a heat source is adopted as the heat source of the high temperature regenerator 1, it is preferred high temperature combustion gas is supplied through the exhaust heat fluid pipe 10A to the heat recovery devices 8, 9.

Further, the low temperature regenerator 2 and the condenser 3, and the evaporator 4 and the absorber 5 may be adjacently provided within one container, respectively. The refrigerant pipe 16 for leading the refrigerant vapor heated and generated in the low temperature regenerator 2 to the condenser 3, and the refrigerant pipe 19 for leading the refrigerant vapor heated and generated in the evaporator 4 to the absorber 5 may be replaced with eliminators provided in the respective containers.

Further, preferably, the absorption refrigerating machine may be an absorption refrigerating machine that performs a cooling operation only, such as air cooling, as described above, or may be an absorption refrigerating machine that performs a heating operation, such as air heating, as well as the air cooling. In the latter absorption refrigerating machine, a pipe is connected so that the refrigerant vapor heated and generated in the high temperature regenerator 1, and the high temperature absorbent solution from which the refrigerant vapor is evaporated and separated, can be directly supplied to a low temperature barrel for receiving the evaporator 4 and the absorber 5, high temperature and high-pressure vapor is inputted through the heat source fluid supply pipe 10 to heat the diluted absorbent solution without flowing cooling water through the cooling water pipes 21, 22, and the brine heated to, for example, about 55° C. in the heat exchanger pipe 4A of the evaporator 4 is circulated through the brine pipe 23 to the load.

According to the present invention as described above, heat held in the exhaust heat fluid may be efficiently collected. Further, even though the temperature of cooling water supplied to the absorber falls suddenly, and thereby the temperature of the diluted absorbent solution discharged from the absorber and supplied to the high temperature regenerator falls suddenly, the diluted absorbent solution is heated by an exhaust heat fluid flowing through the exhaust heat fluid pipe and is supplied to the low temperature heat exchanger. Thus, even if the heat exchange efficiency of the low temperature heat exchanger is raised to reduce the required heat capacity inputted into the absorption refrigerating machine, no problems occurs in that the temperature of the concentrated absorbent solution supplied from the low temperature regenerator to the absorber abnormally decreases and crystallizes by heat exchange in the low temperature heat exchanger, thereby resulting in a situation where the operation becomes impossible.

What is claimed is:

1. An absorption refrigerating machine comprising:
a high temperature regenerator, a low temperature regenerator, a condenser, an evaporator, an absorber, a low temperature heat exchanger for performing heat exchange between absorbent solutions entering and leaving the absorber, a high temperature heat exchanger for performing heat exchange between absorbent solutions entering and leaving the high temperature regenerator,
a first heat recovery device for collecting heat remaining in a heat exhaust fluid discharged from the high temperature regenerator after heating an absorbent solution in the high temperature regenerator through heat exchange between the heat exhaust fluid and the absorbent solution leaving the absorber and flowing into the low temperature heat exchanger, and
a second heat recovery device upstream, with respect to the heat exhaust fluid, of the first heat recovery device for collecting heat remaining in the heat exhaust fluid through heat exchange between the beat exhaust fluid and absorbent solution discharged from the low temperature heat exchanger, and flowing into the high temperature heat exchanger.

* * * * *

UNITED STATES PATENT AND TRADEMARK OFFICE
CERTIFICATE OF CORRECTION

| | |
|---|---|
| PATENT NO. | : 6,993,933 B2 |
| APPLICATION NO. | : 10/831542 |
| DATED | : February 7, 2006 |
| INVENTOR(S) | : Haruki Nishimoto et al. |

Page 1 of 1

It is certified that error appears in the above-identified patent and that said Letters Patent is hereby corrected as shown below:

Column 1, line 46, "10Y" should read --100Y--; and

Column 6, line 52, "beat" should read --heat--.

Signed and Sealed this

Twenty-eighth Day of November, 2006

JON W. DUDAS
*Director of the United States Patent and Trademark Office*